March 1, 1955  C. R. NICOLIN  2,702,987
EXPANSIBLE ELEMENT FOR CONNECTING
PIPES OF DIFFERENT DIAMETERS
Filed June 11, 1952
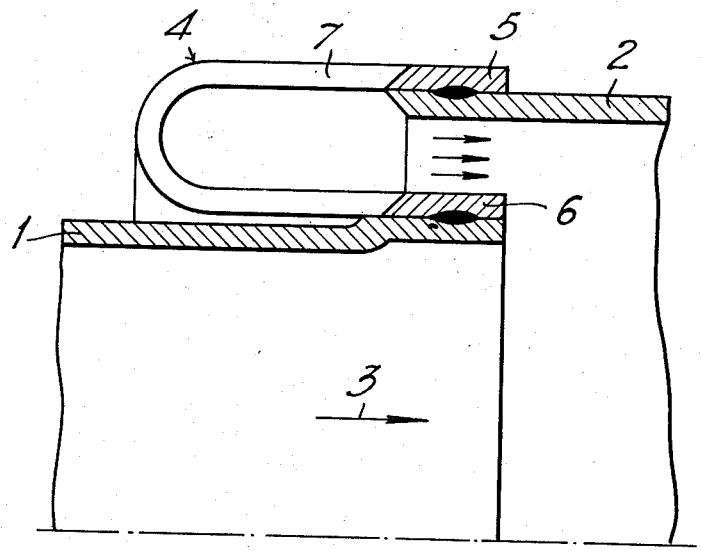
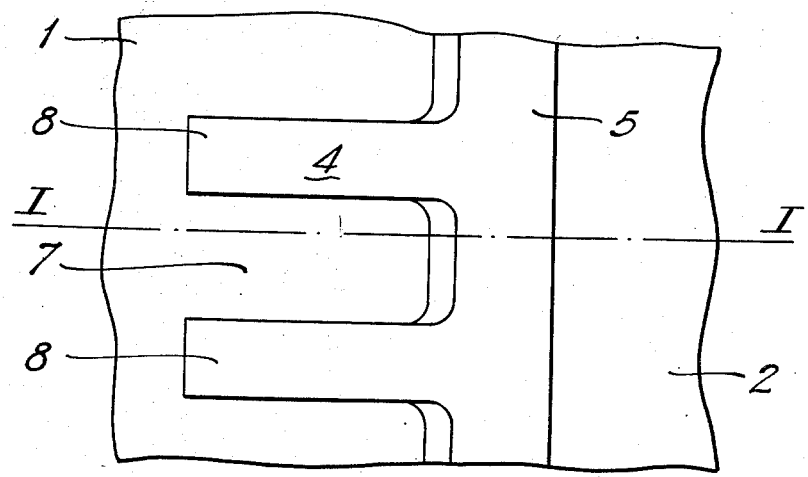
Inventor
Curt René Nicolin
by Sommers & Young
Attorneys

United States Patent Office 2,702,987
Patented Mar. 1, 1955

2,702,987

EXPANSIBLE ELEMENT FOR CONNECTING PIPES OF DIFFERENT DIAMETERS

Curt René Nicolin, Finspong, Sweden

Application June 11, 1952, Serial No. 292,827

1 Claim. (Cl. 60—39.32)

The present invention relates to an element for expansibly connecting two cylindrical or conical bodies of different diameters through which element a current medium is adapted to be introduced into between said bodies.

According to the invention the connecting element comprises a ring the axial section of which is in the form of the letter U in a recumbent position, that is to say, with the side members representing the stems of the U extending in the axial direction of the ring, the end portions of each of said side members being welded to an individual one of the cylindrical or conical bodies to be connected, and the curved portion of the ring together with the adjacent portions of the side members being formed with radially extending slots for permitting the said current medium to pass through the ring axially into between the cylindrical or conical bodies.

As an example of the range of use of the invention a connecting element embodying the invention shall hereinafter be described as applied to the combustion chamber of a gas turbine.

In the accompanying drawing, Fig. 1 is an axial section on section line I—I of Fig. 2 of portions of two tubes expansibly connected together by means of an element according to the invention. Fig. 2 is a top plan view of the device shown in Fig. 1.

With reference to the drawing, the numerals 1 and 2 designate two cylindrical tubes which are adapted to be traversed by a burning gas in the direction of the arrow 3, Fig. 1. Said tubes, which are of different diameters, are connected together by means of an annular element 4 the axial section of which is in the form of the letter U in a recumbent state, that is to say, with the side members representing the stems of the U extending in the axial direction of the annular member 4. Said side members 5 and 6 are welded to the tubes 2 and 1, respectively. As will more readily appear from Fig. 2, radial slots 7 are formed in the annular connecting element 4 at some distance from each other. By this means ports are obtained for the entrance of cooling air which is adapted to pass along the inside of tube 2 for cooling same.

The portions of the connecting member 4 remaining between the slots 7 are of a substantially rectangular shape, as indicated at 8 in Fig. 2, the axial length of said portions 8 as determined by the axial length of the slots 7 being such as to allow the portions 8 to act as springs capable of eliminating radial displacements owing to differences in temperature.

In operation, the tube 1 will get hotter than the tube 2 giving rise to different expansions by heat. By a suitable choice of the axial length of the annular element and the thickness of material thereof the stresses caused by deformation may be kept at such a low value as to avoid any risk of fatigue breaks owing to the repeated variations of load occurring in a combustion chamber.

The annular element 4 is further so designed as to secure a proper flow of the cooling air. Said air enters through the slots 7 and traverses the space between the outer tube 2 and the inner side member of the element 4 as a uniform stream parallel with the tube 2 which is capable of effectively cooling said tube.

The annular connecting element may, preferably, be manufactured from a round blank having a circular opening in its center, the manufacturing process comprising a pressing action by which the flat blank is transformed to the U-shape above stated. The slots 7 are formed by means of a radially operating cutter or by a stamping machine.

The side members of the connecting element may be welded simultaneously to the tubes 1 and 2. To this end an electrode may be placed from outside against the side member 5 and another electrode may be placed from inside against that portion of the tube 1 which is in contact with the side member 6. Between the side members a contact piece, for instance, of beryllium bronze, is placed.

I claim:

A device for the expansible connection of two coaxial tubular elements of a gas turbine combustion chamber which are of different diameters and located with relation to each other with the element of the smaller diameter projecting for a portion of its length into the element of the larger diameter so as to leave an annular air gap between the elements for the entrance of cooling air, said connecting device comprising a ring the axial section of which is U-shaped having axially extending edge portions the free ends of which are connected by welding to the outer peripheral surfaces of the elements of smaller and larger diameter, respectively, while the arched portion of said U-shaped ring together with the adjacent portion of the edge portions of the ring are formed with radially extending notches for permitting an axial flow of a fluid medium through the ring in between said elements, the remaining portions between said notches forming approximately rectangular springs of such a length as to allow radial displacements of the elements due to differences in temperature while keeping the stresses induced thereby at a low value by bending of said springs.

References Cited in the file of this patent

UNITED STATES PATENTS

| 2,254,853 | Mouromtseff | Sept. 2, 1941 |
| 2,603,060 | Brown | July 15, 1952 |

FOREIGN PATENTS

| 31,338 | Netherlands | Nov. 15, 1933 |